United States Patent Office 3,290,996
Patented Dec. 13, 1966

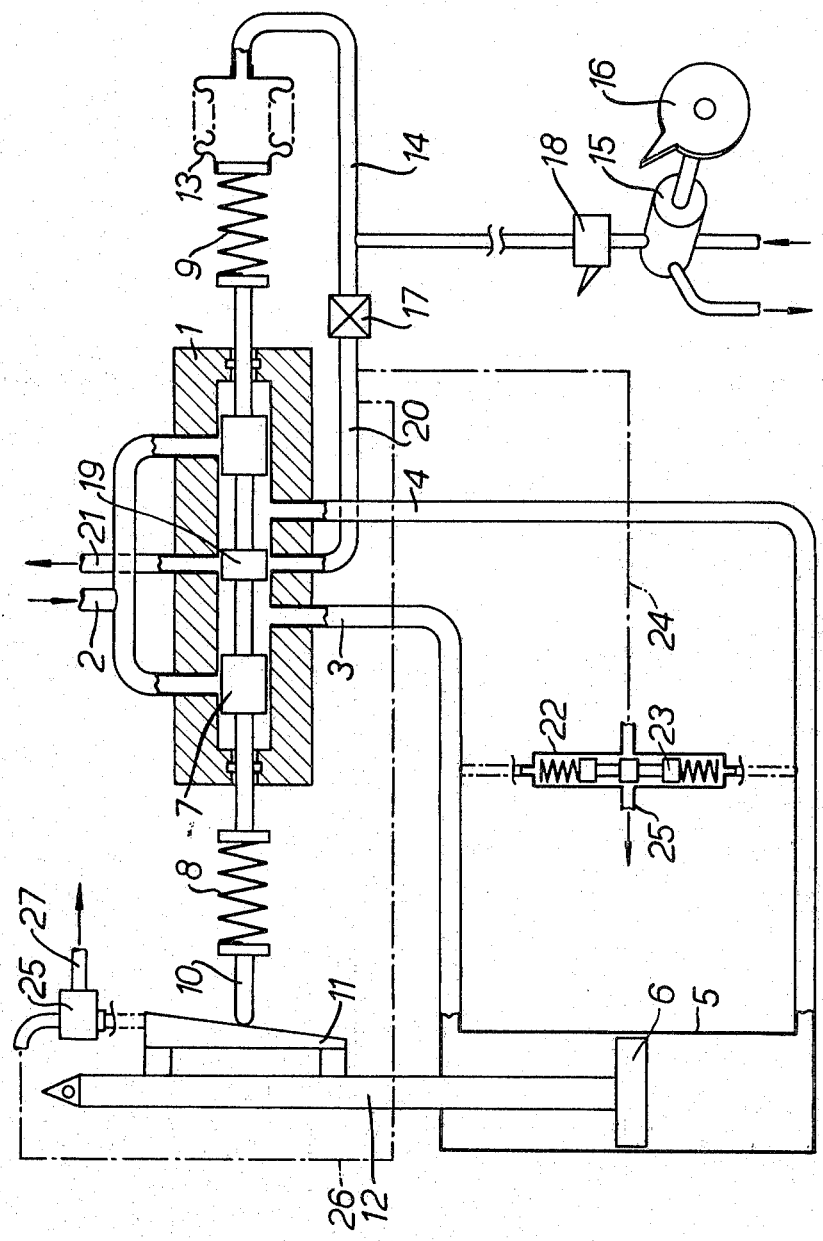

3,290,996
REMOTE CONTROL OF FLUID VALVES
Terence John Floyd, Wellington, England, assignor to Audco Limited
Filed Nov. 12, 1964, Ser. No. 410,422
Claims priority, application Great Britain, Nov. 13, 1963, 44,824/63
9 Claims. (Cl. 91—1)

This invention relates to remote control systems for hydraulically operated valves and is particularly applicable to the control of the cargo valves in oil tanker vessels.

Such valves are usually mounted in the bottom of the cargo tanks and operated by hydraulic fluid under pressure supplied from a ring main through a servo valve for each cargo valve. Each servo valve is actuated in accordance with the difference between the actual position of the cargo valve closure member and the desired position thereof, as transmitted from a central control station, to admit hydraulic fluid under pressure to an actuator for adjusting the position of said closure member.

Hydraulic control systems, although possessing certain advantages over comparable pneumatic and electrical systems, have in the past necessitated the provision of several pipes connecting each servo valve to the central control station. One or more of these pipes has been required to convey fluid for operating the servo valve and another for conveying an indication to the control station of the actual position of the cargo valve closure member. In view of the fact that the cargo valves are usually a considerable distance away from the control station such systems tend to be expensive in terms of lengths of piping and installation.

One object of the present invention, therefore, is to reduce the amount of piping used and to this end, according to one feature of the invention, the servo valve member is urged in one direction by a force which varies in direct proportion to the position of the closure member and in the opposite direction by hydraulic pressure the value of which is pre-set at the control station in accordance with the desired position of said closure member. The servo valve will thus compare these two pressures and in the event of any unbalance will admit fluid under pressure to the main valve actuator to correct the position of said closure member.

It is a further object of the invention to provide simple means for indicating at the control station whether or not the valve closure member has attained a particular position and to this end, according to a further feature of the invention, a further valve is provided, operable in response to the position of said closure member to open a circuit through which the fluid supplied at a pre-set pressure can leak, and a device is provided at the control station for indicating the presence of fluid flow in said circuit.

The invention will be described in detail with reference to the accompanying diagrammatic drawing of a hydraulic circuit for operating a cargo valve closure member for an oil tanker vessel which drawing illustrates, by way of example, three optional forms of said further valve.

As shown, a spool-type servo valve 1 controls the supply of hydraulic fluid from a pressure line 2 to lines 3 and 4 connected to a cylinder 5 on opposite sides of an actuator piston 6 for the closure member (not shown) of the cargo valve. The valve 1 is provided with a movable spool 7 the ends of which extend outside the valve casing into engagement with calibrated springs 8 and 9 of which the former presses a cam follower 10 against the surface of a cam 11 secured to the rod 12 of the piston 6 and so shaped that the pressure exerted on the spring varies in direct proportion to the position of the piston 6 and thus of the closure member. The spring 9 engages a bellows 13 supplied with hydraulic fluid through a line 14 containing a reducing valve 15 located at the control station and manually adjustable, by means of a calibrated handwheel 16, to pre-set the pressure at which fluid is supplied to the bellows.

In operation hydraulic fluid is supplied to the bellows 13 at a pressure corresponding to a desired position of the cargo valve closure member and if the latter is not already in that position or is subsequently displaced therefrom the difference in pressure exerted on the opposite ends of the valve spool 7 displaces it to the left or the right from the position shown in the drawing to admit fluid to the upper or lower side of the piston 6 through the line 3 or 4 to move the closure member to the desired position. When the closure member has attained this position the pressure exerted on the valve spool 7 through the spring 8 will once again be equal to that exerted through the spring 9 and the valve spool will regain its central position in which it cuts off the supply of pressure fluid to the cylinder 5.

In order to indicate to the operator at the control station whether or not the valve closure member has attained a particular position, hydraulic fluid supplied through the valve 15 at a pre-set pressure is permitted to leak through a variable restrictor 17, which may be a needle valve, into a circuit controlled by a further valve operable in response to the position of said closure member, and a device 18 is provided at the control station for indicating the presence of fluid flow in said circuit.

This further valve preferably takes the form of an additional land 19 on the valve spool 7 which permits leakage of fluid through lines 20 and 21, only when the valve spool 7 is displaced from its central position to admit fluid to the actuator for adjusting the position of said valve member.

Alternatively the valve 19 may be replaced by a valve 22 connected between lines 3 and 4, the fluid pressures in which are exerted on the respective ends of a valve spool 23 which, upon displacement of the valve spool 7 to admit pressure fluid to one or other side of piston 6, is itself displaced in response to the differential pressure in the lines 3 and 4 to permit leakage of fluid through lines 24 and 25.

It will be apparent, therefore, that whenever the cargo valve closure member is not in its correct position and the spool 7 of the servo valve 1 is displaced from its central position to admit operating fluid to the actuator piston 6, the valve member 19 or 23 will permit leakage of fluid through lines 20 and 21 or 24 and 25 and this leakage will be indicated at the control station by the device 18.

Conversely the valve member 19 or 23 may be so arranged that the indicated leakage takes place only when the cargo valve closure member is in its correct position.

In a further modification the valve member 19 is replaced by a valve 25 operable by the valve actuator when the actuator piston 6 is at the end of its stroke in the fully open or fully closed position of the closure member to either prevent or permit leakage of fluid through lines 26 and 27.

It is possible, therefore, for an operator at the control station to determine at any moment whether or not each cargo valve is in the required operative position.

I claim:
1. In a remote control system for a hydraulic valve actuator, said system having means for connecting it to a source of hydraulic fluid under pressure and a remote control station, means comprising a servo valve member movable in opposite directions to control the supply of hydraulic fluid under pressure from said source to opposite sides of said actuator for determining the position of said actuator, mechanical means connected for tending to urge said servo valve member in one direction with a force which varies in direct proportion to the position of said actuator, hydraulic fluid pressure means connected for tending to urge said servo valve member in the opposite direction at a pressure, the value of which is preset at said remote control station in accordance with the desired position of said actuator, further means operable, when said actuator has either reached or departed from a particular position, to open a circuit through which hydraulic fluid supplied at said pre-set pressure can leak, and a device located at said control station for indicating the presence of fluid flow in said circuit.

2. In the system defined in claim 1, said mechanical means comprising a cam on said actuator acting through a spring upon one end of said servo valve member.

3. In the system defined in claim 1, said hydraulic means comprising a bellows supplied with hydraulic fluid through a manually adjustable valve and acting upon one end of said servo valve member through a spring.

4. In the remote control system defined in claim 1, said further means comprising a further valve operatively connected to said circuit and connected to be movable in response to changing position of said actuator.

5. In the system defined in claim 4, said further valve being connected between fluid lines connecting the opposite sides of said actuator to said servo valve member and actuated in accordance with the balance of pressure in said lines.

6. In the system defined in claim 4, said further valve being open during supply of operating fluid to said actuator.

7. In the system defined in claim 4, said further valve being connected to said actuator for operation thereby at one or other end of its stroke.

8. In the system defined in claim 4, said servo valve member being a spool valve slidable in a chamber having conduit connections to opposite sides of said actuator, and said further valve comprising a land on said spool valve.

9. In the system defined in claim 1, said actuator having an operating piston, and said servo valve member being a spool valve slidable in a chamber having conduit connections to opposite sides of said piston.

References Cited by the Examiner
UNITED STATES PATENTS

| | | | |
|---|---|---|---|
| 2,265,106 | 12/1941 | Fieux | 91—387 |
| 2,600,777 | 6/1952 | Johnson | 91—387 |
| 2,668,556 | 2/1954 | Meyer | 91—387 |
| 2,997,987 | 8/1961 | Eggenberger | 91—387 |
| 3,003,475 | 10/1961 | Rouvalis | 91—461 |
| 3,096,690 | 7/1963 | Hayner | 91—387 |

MARTIN P. SCHWADRON, *Primary Examiner.*

PAUL E. MASLOUSKY, *Examiner.*